US007896369B2

(12) United States Patent
Tomlin et al.

(10) Patent No.: US 7,896,369 B2
(45) Date of Patent: Mar. 1, 2011

(54) VEHICLE SUSPENSION ASSEMBLY WITH UNIQUE GEOMETRY

(75) Inventors: Neil James Tomlin, Braybrooke (GB); Michael Brannigan, Narberth, PA (US)

(73) Assignee: Hendrickson USA, L.L.C., Itasca, IL (US)

( * ) Notice: Subject to any disclaimer, the term of this patent is extended or adjusted under 35 U.S.C. 154(b) by 267 days.

(21) Appl. No.: 12/025,416

(22) Filed: Feb. 4, 2008

(65) Prior Publication Data

US 2009/0194963 A1    Aug. 6, 2009

(51) Int. Cl.
*B60G 9/02* (2006.01)
*B60G 11/26* (2006.01)

(52) U.S. Cl. .................. 280/124.116; 280/124.157; 280/124.156

(58) Field of Classification Search .......... 280/124.116, 280/124.157, 124.156, 678, 683, 86.5, 43.23
See application file for complete search history.

(56) References Cited

U.S. PATENT DOCUMENTS

| 2,740,622 | A | | 4/1956 | Hickman | |
|---|---|---|---|---|---|
| 2,855,212 | A | | 10/1958 | Houser | |
| 3,007,715 | A | | 11/1961 | Maharick | |
| 3,007,716 | A | | 11/1961 | Maharick | |
| 3,069,185 | A | * | 12/1962 | Holmstrom | 280/124.157 |
| 3,154,321 | A | * | 10/1964 | McLean | 280/124.116 |
| 3,380,758 | A | | 4/1968 | Granning | |
| 3,630,541 | A | | 12/1971 | Carlson et al. | |
| 3,794,344 | A | | 2/1974 | Raidel | |
| 4,181,323 | A | * | 1/1980 | Raidel | 280/86.75 |

(Continued)

FOREIGN PATENT DOCUMENTS

DE    103 51 465    6/2005

(Continued)

OTHER PUBLICATIONS

PCT Search Report, Written Opinion,and Transmittal letter dated Mar. 16, 2009 for related PCT Application No. PCT/US2009/032337. DE 103 51 465 and JP2000-118222 and machine-translations thereof provided by the search authority are also included.

*Primary Examiner*—Ruth Ilan
(74) *Attorney, Agent, or Firm*—Cook Alex Ltd.

(57) ABSTRACT

A suspension system for supporting an axle and connected to a vehicle frame, including a pair of transversely spaced frame brackets mounted on and depending from the vehicle frame. Each of the frame brackets having one or more mounting points spaced along its perimeter for mounting of suspension components, such as shock absorbers, and having a protruding air spring attachment plate that extends inboard toward the center of the vehicle frame. The suspension system also includes a first pair of air springs, the upper portions of which are mounted to the air spring attachment plates of the frame brackets. The lower portions of the air springs are mounted to suspension arm. The suspension system includes a second pair of air springs that are longitudinally separated from the first pair of air springs and that are connected to the suspension arm assemblies and to the frame. A pair of shock absorbers is connected at their lowest point to the suspension arm assemblies and at their highest point to a mounting point on the frame brackets. The suspension arm assemblies are coupled to and support the axle. The suspension system also includes a torque box coupled to the vehicle frame and the axle.

19 Claims, 6 Drawing Sheets

U.S. PATENT DOCUMENTS

| | | | |
|---|---|---|---|
| 4,300,787 A | | 11/1981 | Vandenberg |
| 4,718,692 A | * | 1/1988 | Raidel ................. 280/124.116 |
| 4,763,923 A | * | 8/1988 | Raidel ....................... 280/86.5 |
| 5,058,916 A | * | 10/1991 | Hicks ........................ 280/86.5 |
| 5,127,668 A | | 7/1992 | Raidel |
| 5,230,528 A | * | 7/1993 | Van Raden et al. ......... 280/86.5 |
| 5,458,359 A | | 10/1995 | Brandt |
| 5,505,481 A | * | 4/1996 | VanDenberg et al. ...... 280/86.5 |
| 5,524,921 A | | 6/1996 | Ellingsen |
| 5,549,320 A | | 8/1996 | Ellingsen |
| 5,564,521 A | | 10/1996 | McLaughlin et al. |
| 5,649,719 A | | 7/1997 | Wallace et al. |
| 5,785,345 A | | 7/1998 | Barlas et al. |
| 5,882,031 A | | 3/1999 | VanDenberg |
| 5,988,672 A | | 11/1999 | VanDenberg |
| 6,109,630 A | | 8/2000 | Dazy et al. |
| 6,129,367 A | | 10/2000 | Bublies et al. |
| 6,471,223 B1 | * | 10/2002 | Richardson ................ 280/86.5 |
| 6,527,286 B2 | | 3/2003 | Keeler et al. |
| 6,834,873 B1 | * | 12/2004 | Vander Kooi et al. . 280/124.107 |
| 7,114,735 B2 | * | 10/2006 | Mattocks ............... 280/124.11 |
| 2002/0067017 A1 | | 6/2002 | Keeler et al. |

FOREIGN PATENT DOCUMENTS

| | | |
|---|---|---|
| JP | 2000-118222 | 4/2000 |

* cited by examiner

VEHICLE SUSPENSION ASSEMBLY WITH UNIQUE GEOMETRY

BACKGROUND OF THE INVENTION

1. Field of the Invention

The present invention relates to vehicle suspensions and components thereof. In particular, the present invention relates to a novel frame hanger or bracket assembly and suspension systems with unique geometries for controlling the position of an axle relative to the frame of a vehicle.

2. Background

The goal of axle/suspension systems for vehicles is to minimize the transfer of forces between the axle and the frame. Axle/suspension systems must also control various forces acting on the axle itself, which may cause the axle to become misaligned or may alter the vertical, lateral, and/or longitudinal position of the axle relative to the frame. Axle/suspension systems must also minimize the yaw, wind-up (pitch) and roll movement of the axle.

Axle/suspension systems traditionally incorporated various components, such as anti-roll bars, shocks, springs, airbags and linkages, to control these aforementioned forces acting on and being transmitted by the axle. Additional components add weight, utilize additional space both along and underneath the frame of the vehicle, and increase the complexity of these systems.

Figure 1:
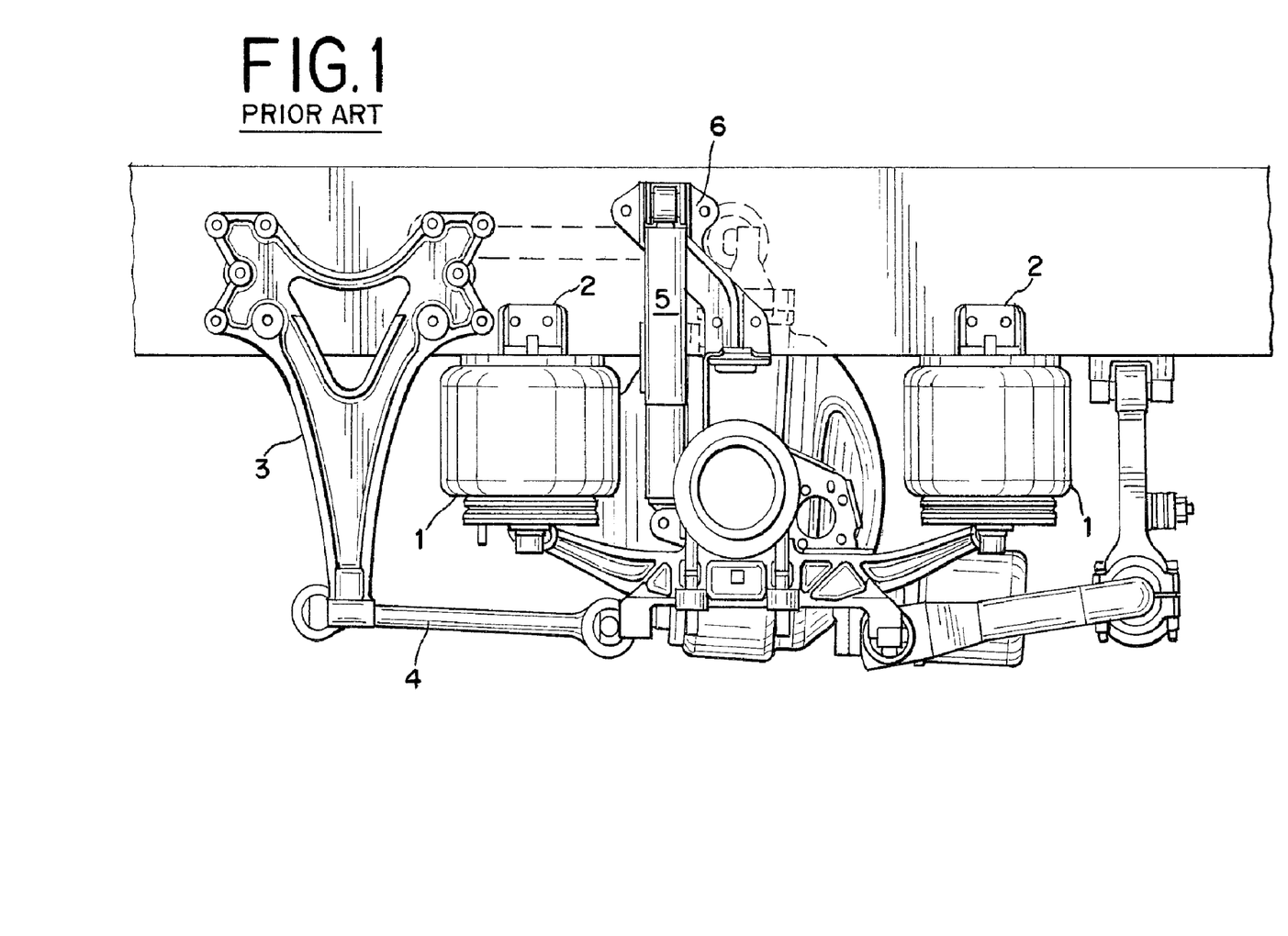
FIG. 1 is a side view of a vehicle, vehicle axle, and vehicle suspension components as known in the art.

FIG. 1 illustrates one side of a prior art suspension system utilizing four separate air springs (two on each side of the vehicle). In the prior art, separate components are mounted to the frame rails of the vehicle using multiple individual brackets. For example, the air springs 1 are attached to the frame via separate mounting brackets 2. The frame brackets 3 are mounted ahead of the air springs 1 and linked to the suspension by torque rod linkages 4. The upper portions of the shock absorbers 5 are mounted to the frame utilizing another bracket 6. As illustrated, the multiple brackets add weight and require additional space. As a result, prior art suspension systems are spread out along the frame of the vehicle, the suspension is relatively heavy, and the suspension envelope is relatively large.

SUMMARY OF THE INVENTION

The present invention seeks to reduce the problems and complexities faced by previous suspension systems by reducing the number of components, the weight and the utilized space. These advantages are made possible, in part, due to a novel frame bracket assembly that allows for some components of the suspension system to be "nested" within the suspension envelope. The frame bracket also integrates mounting points for suspension components, eliminating the need for extra brackets. By integrating mounting points and reducing the overall number of components, the present invention weighs less and is less complex compared to other available systems.

Therefore, it is an objective of the present invention to provide a suspension assembly or system which minimizes the movement of the axle, generally maintains the position of the axle during the operation of the vehicle, and limits the transfer of forces between the axle and frame.

Another objective of the present invention is to provide a new and improved design for a four-bag suspension system, utilizing four air springs to control the vehicle suspension.

Another objective of the present invention is to provide a vehicle suspension system with less complexity and/or less parts, resulting in less weight and cost.

Another objective of the present invention is to provide a vehicle suspension system which utilizes less space and has a smaller envelope than other similar available systems.

Another objective of the present invention is to provide a unique frame bracket that integrates air spring and upper shock absorber eye attachments, includes longitudinal load control, and improves the geometry of the system by nesting air springs within the chassis envelope.

These objectives and advantages are obtained by a suspension assembly for mounting an axle on a longitudinally extending vehicle structure; the suspension assembly including a pair of transversely spaced frame brackets mounted each side of the vehicle structure. Each frame bracket of the suspension system has a plate-like member projecting inward toward the center of the vehicle for permitting attachment of an air spring assembly. A pair of suspension arms supports the axle. The suspension arms each have an axle clamp assembly that is used to clamp the axle. The suspension arms are coupled to the frame brackets via longitudinal torque rods and shock absorbers. Four air spring assemblies are attached to the ends of the suspension arms. Two air spring assemblies are located in front of the axle, while the other two assemblies are located behind the axle. Two of the air spring assemblies are attached to the plate-like member of the frame bracket. Unlike the air spring assemblies attached to the frame brackets, the second pair of air spring assemblies is directly attached between the suspension arm and the frame (via a mounting bracket). A torque box is mounted to the frame of the vehicle via torque box brackets. A pair of coupler brackets surrounds the differential of the axle and connects the axle to the torque box.

The benefits and characteristics of the novel suspension system set forth herein will become apparent from the following more detailed description. It will be understood, however, that an apparatus could still appropriate the invention claimed herein without accomplishing each and every one of these benefits gleaned from the following description. The appended claims, not the benefits of subject matter set forth herein, define the subject matter protected by law. Any and all benefits are derived from the preferred forms of the invention, not necessarily the invention in general.

BRIEF DESCRIPTION OF THE DRAWINGS

In the following detailed description, reference will frequently be made to the following views of the drawing, in which like reference numerals refer to like components and in which.

DETAILED DESCRIPTION

Figure 2:
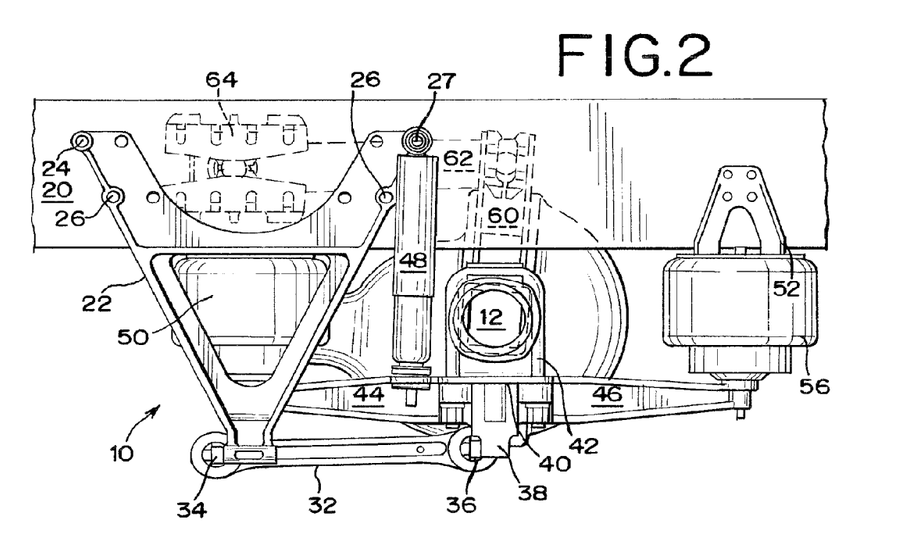
FIG. 2 is a side view of a vehicle frame, vehicle axle, and vehicle suspension components constructed in accordance with the principles and teachings set forth herein.

FIG. 2 illustrates some of the vehicle components present on one side of a vehicle in what is generally referred to as a 4-bag suspension system. Illustrated in FIG. 2 are a vehicle axle 12 and the associated vehicle suspension 10. It will be understood that the opposite side of the vehicle includes the opposite side of the axle 12 and duplicative suspension components.

The vehicle suspension system 10 mounts the axle 12 on the vehicle frame. The vehicle frame typically consists of a pair of spaced-apart, parallel, longitudinally extending frame rails 20. The frame rails 20 are generally C-shaped and open up to the center of the vehicle. The vehicle axle 12 extends laterally across the vehicle and is generally perpendicular to the frame rails 20.

The suspension system 10 is mounted on the frame rails 20 by a pair of frame brackets (or frame hanger brackets) 22. Each illustrated frame bracket 22 has an inverted A-shape. The top portion of each frame bracket 22 has one or more mounting points 24-27 located along its perimeter. The mounting points 24-27 allow for suspension components to be connected directly to the frame bracket 22, rather than being separately attached to the frame rail 20. The mounting points 24-27 may be located above, below, or proximate to the general area of the frame rail 20. At the lower point of the frame bracket 22, a U-joint 80 (see FIG. 8) accepts a longitudinal torque rod (or control arm) 32.

The longitudinal torque rod 32 is pivotally connected to the frame bracket via a bushing 34 that is bolted or otherwise attached to the frame bracket 22. The aft portion of the longitudinal torque rod is pivotally connected via bushing 36 to the center pivot joint of the trailing-arm suspension arm 40.

A pair of suspension arms 40 supports the axle 12. A suspension arm is located on each side of the axle. An axle clamp assembly 42 rigidly captures a portion of the axle 12 adjacent to a respective end of the axle and rigidly secures the axle 12 to a suspension arm 40. Suspension arm 40 serves as an axle seat for the suspension.

Mounted to the forward extension (or forward portion) 44 of the suspension arm 40 is the lower portion of a shock absorber 48. The upper portion of the shock absorber 48 is attached to the frame bracket 22 at mounting point 27. The attachment of the shock absorber 48 to the frame bracket 22 eliminates the need for a discrete bracket and associated fasteners for the shock absorber 48.

The base of the forward air spring 50 is mounted to and seated upon the forward portion (or forward support arm) 44 of support arm assembly 40. This mounting point is generally near the leading end of the forward extension 44, but alternate embodiments may have varying positions. The air spring extends upward between the forward extension 44 and an air spring attachment plate 68 (see FIG. 8) of the frame bracket 22. The air spring attachment plate 68 (see FIG. 8) extends or protrudes off of the frame bracket toward the center of the vehicle and provides a structure for attachment of the upper end of forward air spring 50. The air spring attachment plate is better illustrated in FIGS. 3, 4, 6 and 8.

The aft air spring 56 is mounted to and seated upon the rear portion (or rear extension) 46 of the suspension arm 40 by known means. The air spring 56 extends between the rear extension 46 and its respective air spring bracket 52, to which the top of the air spring 56 is attached. The air spring bracket 52 secures the air spring 56 to the frame rail 52.

Coupler brackets 60, which are rigidly mounted to the axle and surround the differential, are connected to a torque box 62 assembly. Details regarding the illustrated torque box 60 are set forth in U.S. Pat. No. 6,527,286, the disclosure of which is hereby incorporated by reference. The torque box 62 is generally mounted between the frame rails via a pair of torque box brackets 64. The torque box, its function, its internal components and how it is mounted are in accordance with the teachings of U.S. Pat. No. 6,527,286, which are known to those skilled in the art.

Figure 3:
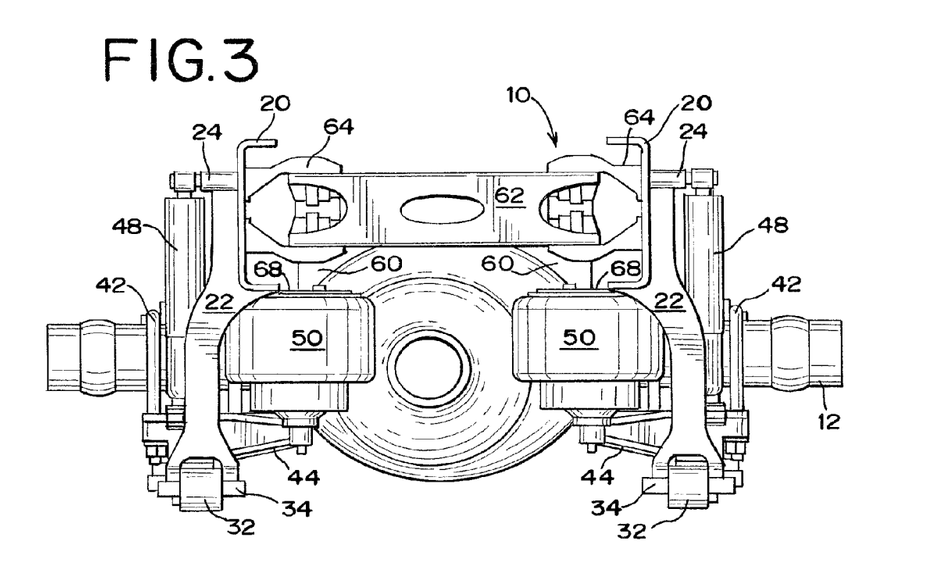
FIG. 3 is a front view of the vehicle axle and vehicle suspension components illustrated in FIG. 2.

FIG. 3 illustrates that the two sides (the left and right side) of the suspension system 10 are symmetrical. As shown in FIG. 3, the forward extensions 44 of the suspension arms 40 are angled inboard toward the center of the suspension system (and the vehicle). The forward extensions 44 may even extend past the inner edge of the frame rails 20. Mounted on the forward extensions 44 are the forward air springs 50. In FIG. 3, the forward air springs 50 are positioned adjacent to and slightly within the frame brackets 22. The air spring attachment plates 68, which are integrally formed with the remainder of the frame brackets, protrude underneath the frame rails and inboard toward the center of the suspension system. The air spring attachment plates 68 secure the upper portions of the forward air springs 50. The air spring attachment plates 68 are generally parallel with axle 12, but other embodiments may have varying cofigurations. For example, the air spring attachment plates 68 may extend from any portion of the frame hanger.

Also connected to the frame brackets 22 are the shock absorbers 48. The shock absorbers 48 are attached at an upper mounting point 24. The lower portion of the shock absorbers 48 and the lower portions of the air springs 50 are connected to the forward suspension extensions 44 of suspension arms 40. The suspension arms 40 are also connected to the axle 12 and rear air springs 56 (see FIG. 2). The axle 12 is rigidly fastened to the suspension arms via axle clamp assemblies 42. Mounted to the axle 12 are coupler brackets 60. Coupler brackets 60 are spaced on either side and on the top of axle 12. The coupler brackets 60 rigidly attach the torque box to the vehicle axle 12. The torque box 62 is also rigidly mounted to the frame rails 20 via mounting torque box brackets 64.

Figure 4:
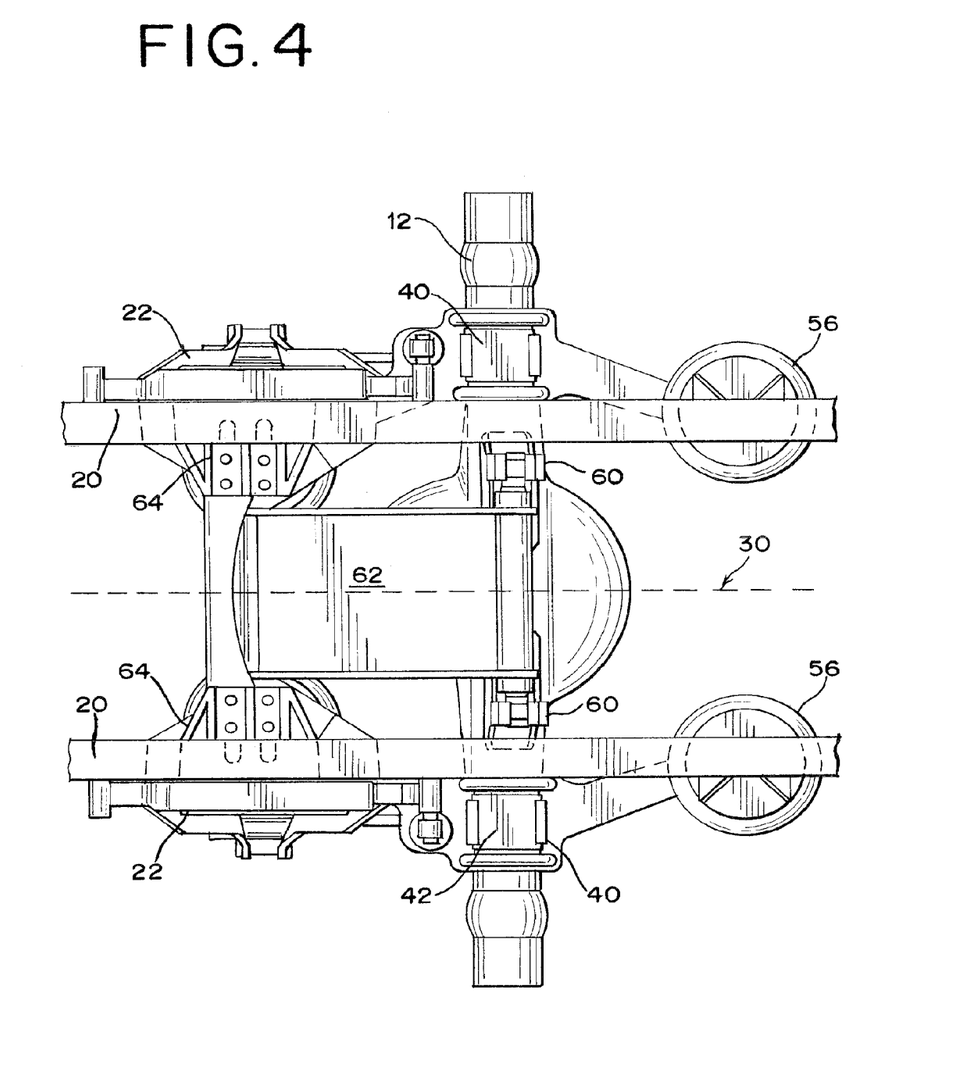
FIG. 4 is a top plan view of the vehicle axle, vehicle frame, and vehicle suspension components illustrated in FIG. 2.

FIG. 4 illustrates more prominently how the forward air springs 50 (hidden partially from view by torque box brackets 64) are inboard toward the centerline 30 of the vehicle. Parallel frame rails 20 are spaced-apart and extend longitudinally. Frame brackets 22 are mounted to and depend from the frame rails 20. A pair of trailing arm suspension arms 40 supports the axle 12. Axle clamp assemblies 42 rigidly secure the axle 12 to the suspension arms 40. Air springs 56 are connected to their respective suspension arms 40 and mounted to the frame rails 20 by brackets 52. The torque box 62 is located between the frame rails 20. The torque box 62 is rigidly mounted to the frame via torque box mounting brackets 64 and to the axle 12 via coupler brackets 60.

Figure 5:
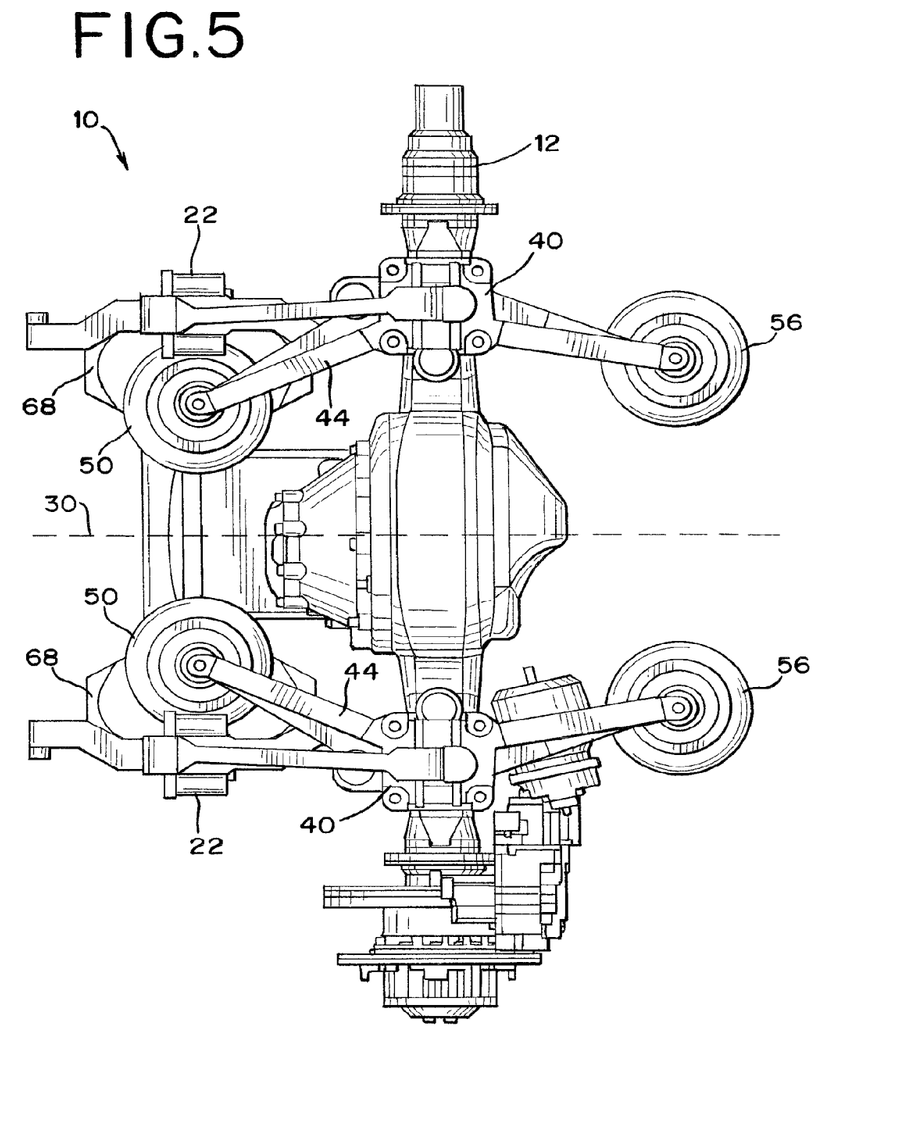
FIG. 5 is a bottom plan view of the vehicle axle and vehicle suspension components illustrated in FIG. 2.

FIG. 5 illustrates the configuration of the trailing suspension arms 40. The suspension arms 40 are generally C-shaped or V-Shaped when view from the top or bottom. The suspension arms 40 face inward toward the centerline 30 of the vehicle. In other words, the arms of the assemblies 40 are angled inboard toward the center of the vehicle and suspension system 10. The suspension arms 40 are also asymmetrical. The forward support arm or extension 44 has a slightly greater angle than the rear extension 46 (when compared along the longitudinal axis). The forward extension 44 also extends inward past the frame rail and further toward the centerline 30 of the vehicle than the rear extension 46. The trailing suspension arms 40 also provide a platform for mounting the air springs 50 and 56.

Figure 6:
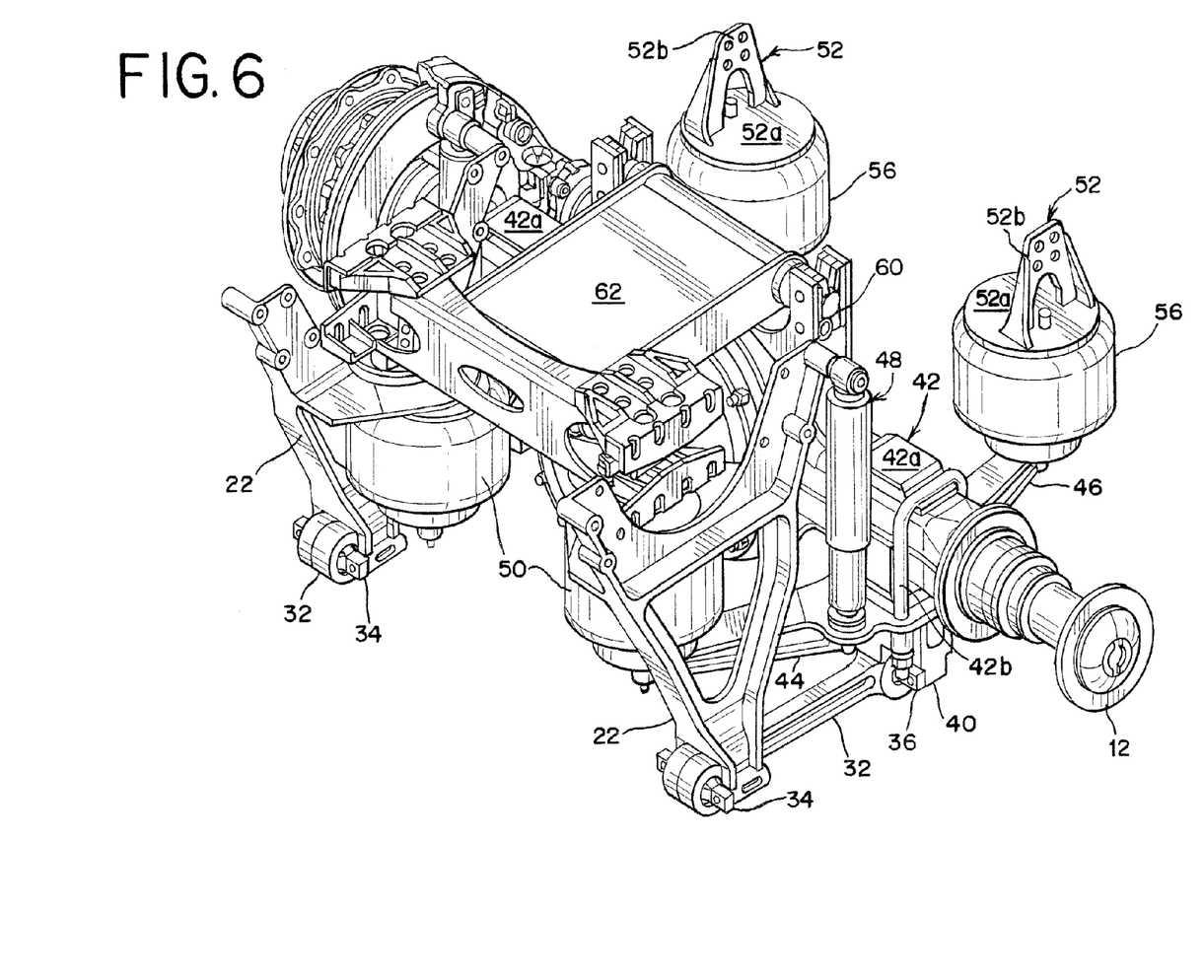
FIG. 6 is a perspective view of the vehicle axle and vehicle suspension components illustrated in FIG. 2.

FIG. 6 illustrates that the upper portions of aft air springs 56 are connected to mounting brackets 52. The mounting brackets 52 have a circular base 52a which is connected to the aft air springs 56. Extending from the circular base 52a is inverted V-shaped structure 52b which is connected to the frame rail. However, the mounting brackets 52 may have any configuration which couples the air springs 56 to the frame rails (not shown). The bases of the air springs 56 are coupled to the end points of the suspension arms 40. The axle 12 is seated on the suspension arms 40. Axle clamp assemblies 42 rigidly capture a portion of the axle 12 adjacent to a respective end of the axle and rigidly secure the axle 12 against suspension arms 40. As shown in FIG. 6, the axle clamp assemblies 42 consists of top pad 42a and two U-bolts 42b received within grooves (not shown) on the top plate 42 and wrap around the axle 12 as illustrated. The U-bolts 42b are connected or coupled to the suspension arms 40. In FIG. 6, the torque control box 62 is rigidly mounted between the frame rails (not shown) using torque box mounting brackets 64. The torque box 64 is attached to the axle via coupler brackets 60.

In FIG. 6, the lower portions of shock absorbers 48 are attached to the suspension arms 40 adjacent to the axle 12. The upper portions of the shock absorbers 48 are attached to the mounting points of the frame hangers 27. The frame hangers 22 receive longitudinal torque rods 32 in a U-shaped joint 80 (see FIG. 8). The longitudinal torque rods 32 are connected to the frame hangers via laterally extending bushings 34, which are bolted or otherwise connected at their ends to the frame hangers 22, as known in the art. The aft portion of the longitudinal torque rods 32 are connected to the suspension arms 40 via bushings, as known in the art.

Extending from the frame hangers 22 and toward the center of the vehicle are the air spring attachment plates 68. The upper portions of the forward air springs 50 are connected to the air spring attachment plates 68. The lower portions of the forward air springs 50 are attached to the end of forward extensions 44 of the suspension arms 40. The forward extensions of the support arms are angled inboard toward the center of the vehicle and the suspension system 10.

As illustrated in FIGS. 2-6, the forward air spring is "nested" behind the frame bracket 22, minimizing the total suspension envelope by allowing the frame bracket to be mounted closer to the axle. With this "nesting" approach (i.e. nesting the forward air spring 50 adjacent to the frame bracket 22), the geometry of the suspension system 10 is improved. The geometry of the suspension is substantially more compact because frame brackets 22 and forward air springs 50 can effectively be positioned in the same longitudinal space. The suspension system 10 utilizes less space and fewer components, such as brackets, control arms, linkages and mounting devices. The suspension system, therefore, weighs less and the reduction of weight permits the maximization of the vehicle's load without exceeding weight restrictions or limitations. The reduction of weight also enhances fuel efficiency of the vehicle. The simplified geometry improves the packaging and frame envelope. These improvements allow manufacturers to use more of the chassis rail for other components and allows for more storage. The geometry of the suspension system 10 also reduces the amount of assembly labor, as it uses few components and is more simplified than other systems.

The geometry of the suspension system 10 also improves the mechanical response of the suspension when various forces act on the axle and/or frame, which in turn improves ride quality. The torque box 62 forms a parallelogram configuration, where the longitudinal torque rods 32 form the lower linkages of the configuration and the torque box 62 forms the upper linkage. The length of the linkages (i.e. either the torque box 62 or longitudinal torque rods 32) can be optimized to provide optimal axle travel for a given specification or situation without compromising other suspension performance parameters.

Figure 7:
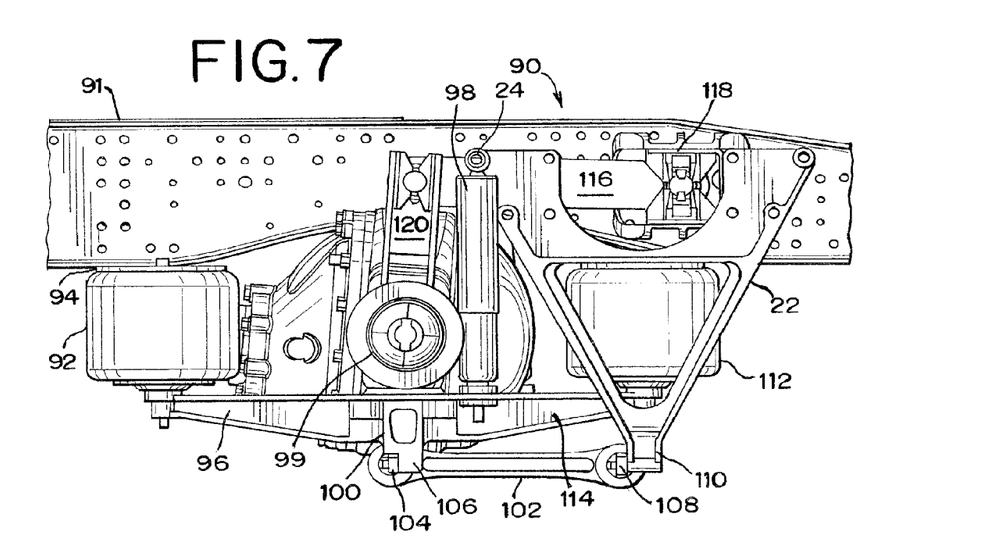
FIG. 7 is a side elevational cutaway view illustrating another embodiment of the vehicle suspension components constructed in accordance with the principles and teaching set forth herein.

FIG. 7 illustrates another embodiment of a suspension system 90, namely a leading-arm configuration of the suspension system. Generally, in the leading-arm configuration the components of the trailing-arm suspension system 10 are mirrored (i.e., reversed front to back). As result, the components that were located forward of the axle 12 in system 10 are now located behind the axle 12 in suspension system 90 and vice-versa. It should be understood that FIG. 7 shows one side of vehicle and that the opposite side of the vehicle includes the opposite side of the axle and duplicative components of the suspension system.

Forward air spring 92 is connected to the frame rail 91 via a mounting bracket 94 and to the forward end 96 of the suspension arm 100. The axle 12 is seated on the suspension arms 100. Axle clamp assemblies rigidly capture a portion of the axle 99 adjacent to a respective end of the axle and rigidly secure the axle 99 to the suspension arm 100. Shock absorber 98 is mounted to the suspension arm 100 behind, but adjacent to, the axle 99. The top of the shock absorber is connected to a mounting point 24 of the frame hanger 22. In suspension system 90, the frame bracket 22 is located toward the aft of the vehicle and behind the axle 12.

A longitudinal torque rod 102 is pivotally connected to the center pivot joint 106 or the lower portion of the suspension arm 100 via a bushing 104. Bushing 104 is bolted or otherwise attached to the assembly 100. The aft portion of the longitudinal torque rod 102 is pivotally connected via bushing 108 to the pivot joint or U-joint 110 of the frame bracket 22.

The aft air spring 112 is mounted to and seated upon the aft end portion 114 of the suspension arm 100. The suspension arm 100 is C-shaped when view from the top or bottom, facing inward toward the center of the vehicle. The suspension arm 100, like the previous embodiment, is also asymmetrical. While the forward extension 44 of the suspension arm 40 shown in FIGS. 1-5 was at greater angle, the aft portion 114 in this embodiment is angled inwardly more so than the front end portion 96. The end of the aft arm portion 114 thus extends toward the center of the vehicle more so than the front end 96. The aft arm portion 114 may even extend past the inner edge of frame rail 91. The top portion of the aft air spring 112 is attached to the air spring attachment plate (not shown), which protrudes inboard toward the center of the vehicle off of the frame bracket 22.

The cutaway view of FIG. 7 shows the torque box 116 positioned between the frame rails 91. The torque box is mounted to the frame rails via torque box brackets 118. The torque box also is mounted to the axle 12 by axle coupler brackets 120.

Figure 8:
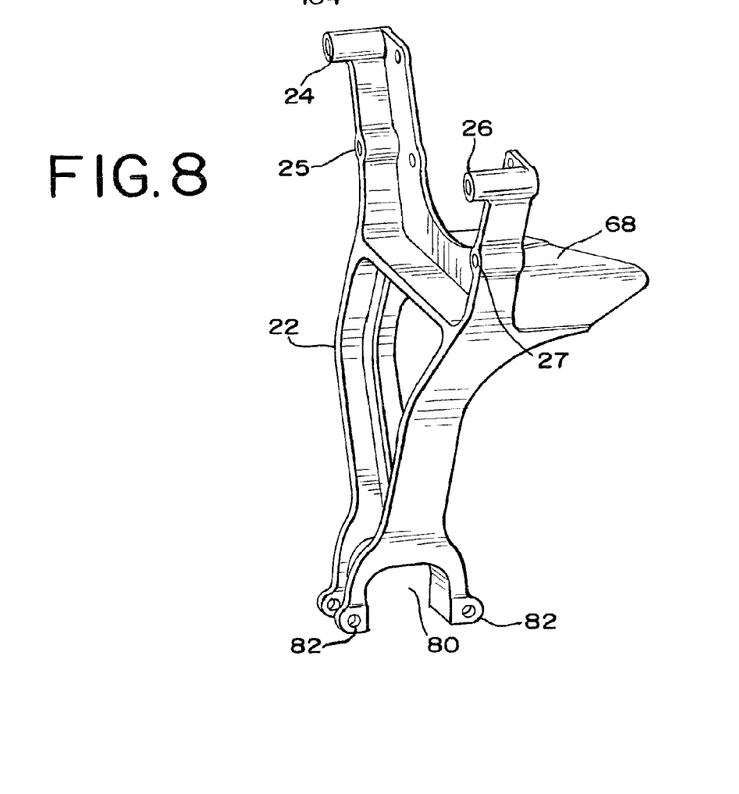
FIG. 8 is a perspective view of a frame bracket constructed in accordance with the principles and teachings set forth herein.

FIG. 8 is a perspective view of the frame bracket 22, shown in FIGS. 2-7. Frame bracket 22 has an inverted A-shape. The frame bracket 22 is symmetrical, allowing the same frame bracket 22 design to be used in multiple configurations. The top portion of each frame bracket 22 is the widest portion and has one or more mounting points 24-27 locate along its perimeter. The mounting points 24-27 allow for suspension components to be connected directly to the frame bracket 22. Suspension components may include shock absorbers or other components of a suspension system. Air spring attachment plate 68 extends generally from the location of the cross member of the inverted A-shape. Air spring attachment plate 68 provides a structure for attachment of an air spring or air bag. It should be understood, however, that the frame bracket 22 may have any configuration where the mounting points are moved to another location or that the air spring attachment plate is repositioned. The lower portion of the frame bracket 22, or the portion furthest from the point where the frame bracket mounts to a frame rail, has a U-shaped joint 80, with legs 82, the open portion of which runs along the longitudinal axis. The U-shaped joint 80 typically receives a longitudinal torque rod, but may receive other components given differing suspension system configurations. On each side of the U-shaped joint 80 are mounting legs 82 that are parallel to each other. The legs 82 are for mounting or attaching the bushings used to connect the longitudinal torque rod.

The vehicle suspension assembly of the present invention is simplified and efficiently maximizes available space. In the foregoing description, certain terms have been used for brevity, clearness and understanding; but no unnecessary limitations are to be implied therefrom, because such terms are used of descriptive purposes and are intended to be broadly construed.

Moreover, the description and illustration of the invention is by way of example, and the scope of the invention is not limited to the exact details shown or described.

Having described the features, discoveries and principles of the invention, the manner in which the improved vehicle suspension assembly is constructed, arranged and used, the characteristics of the components and geometry of the system, and the new and useful results obtained; the new and useful structures, devices, elements arrangements, parts, and combinations are set forth in the appended claims.

What is claimed:

1. A suspension system for mounting an axle to a longitudinally extending vehicle structure having a longitudinally extending centerline, said suspension system comprising:
    a pair of transversely spaced frame brackets, each of said pair of frame brackets being mounted on and depending from said vehicle structure;
    said each of said frame brackets having an air spring attachment plate extending from said frame bracket inboard toward said centerline of said vehicle structure;
    each of said frame brackets having one or more mounting points located along its perimeter;
    a pair of suspension arms transversely spaced, each suspension arm having a first end and a second end; each of said first ends being angled toward said centerline of said vehicle structure;
    each of said suspension arms being attached to said axle;
    a first pair of transversely spaced air springs, each of said first pair of air springs being mounted to a said first end of each of said suspension arms and also mounted to a said air spring attachment plate protruding from one of said frame brackets, said first transversely spaced air springs extending generally upward from the suspension arms to its said air spring attachment plate;
    a pair of second suspension system components, each of said second components being mounted to a said suspension arm and also attached to one of said mounting points on said frame bracket; and a second pair of transversely spaced air springs longitudinally spaced apart from said first pair of air springs, each of said second pair of air springs being mounted on a second end of a said suspension arm, each of said second pair of air springs extending upwardly and being attached to said vehicle structure.

2. The suspension system of claim 1, in which said second suspension system components are shock absorbers.

3. The suspension system of claim 1, in which said frame brackets have an inverted A-shape, the widest portion of said inverted A-shape being the portion which is mounted to said vehicle structure.

4. The suspension system of claim 1, in which said frame brackets have an inverted A-shape and also have a cross-member and said air spring attachment plates protrude from the location of said cross-member.

5. The suspension system of claim 1, in which each of said second ends of said suspension arms is angled toward the centerline of said vehicle structure.

6. The suspension system of claim 1, in which said vehicle structure is a vehicle frame comprising of a pair of spaced apart, parallel longitudinally extending elongated members and in which said frame brackets are mounted on and depend from said elongated members.

7. The suspension system of claim 6, in which each of said air spring attachment plates extend perpendicular to and underneath said elongated members.

8. The suspension system of claim 6, in which each of said elongated members has an inside edge and outside edge, said inside edge being located closer to the centerline of said vehicle structure than said outside edge, and in which said first ends of said suspension arms is angled toward the centerline and extends underneath and past said inside edge of one of said elongated members.

9. The suspension system of claim 8, in which each of said second ends of said suspension arms is angled toward the centerline of said vehicle structure and extends underneath and past said outside edge of one of said elongated members.

10. The suspension system of claim 1, in which each of said frame brackets has a U-shaped joint located at point furthest from the vehicle structure, and each of said suspension arms has a center pivot joint, the suspension system further comprising:
    a pair of torque linkages;
    each of said torque linkages generally extending from a said center pivot joint to said U-shaped joint.

11. The suspension system of claim 10, in which each of said torque linkages is attached to a said frame bracket and a said suspension arm via bushings.

12. The suspension system of claim 1 further comprising:
    a torque control device mounted on and extending between said vehicle structure and said axle, said device having a general box like structure and having a first end and a second end, said first end being connected to said axle and said second end being connected to said vehicle structure.

13. The suspension system of claim 1, wherein said air spring attachment plate laterally extends across said frame bracket.

14. A frame bracket comprising:
    a generally inverted A-shape frame having a lower tip, a length, a width, a height, and an inboard side and an outboard side;
    one or more mounting points located along the perimeter of the frame;
    an air spring attachment plate protruding from said inboard side of said frame laterally extending across said frame; and
    a U-shaped joint located at said lower tip of said frame and a pair of lower mounting points, said lower mounting points being parallel to each other, each of said lower mounting points located on either side of the U-shaped joint.

15. The frame bracket of claim 14, in which said mounting points are generally located above the vertical midway point of said frame.

16. The frame bracket of claim 14, in which said mounting points are generally located in an area of said frame that has the widest width.

17. The frame bracket of claim 14, in which said air spring attachment plate is generally perpendicular to said frame.

18. The frame bracket of claim 14, in which said air spring attachment plate receives, is connected to, or mounted to an air spring.

19. The frame bracket of claim 14, in which said air spring attachment plate protrudes from a cross-member of said frame.

* * * * *